No. 852,351. PATENTED APR. 30, 1907.
D. A. SEYLER, Jr.
ENGINE.
APPLICATION FILED DEC. 10, 1906.
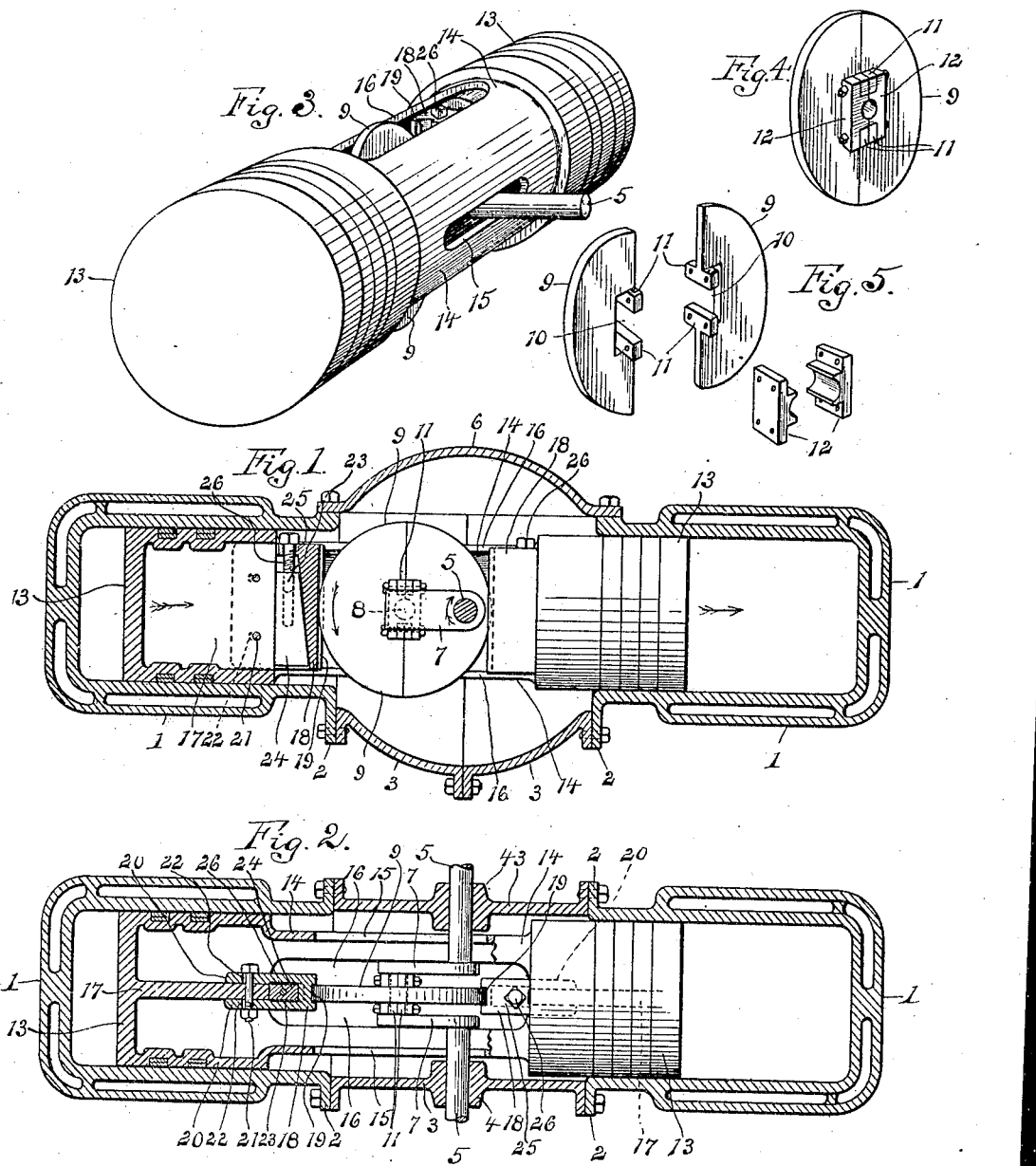
WITNESSES:
Oliver E. Barthel
Anna M. Dorr.
INVENTOR.
Daniel A. Seyler Jr.
BY
ATTORNEYS.

UNITED STATES PATENT OFFICE.

DANIEL A. SEYLER, JR., OF ANN ARBOR, MICHIGAN.

ENGINE.

No. 852,351.

Specification of Letters Patent.

Patented April 30, 1907.

Application filed December 10, 1906. Serial No. 347,000.

*To all whom it may concern:*

Be it known that I, DANIEL A. SEYLER, Jr., a citizen of the United States of America, residing at Ann Arbor, in the county of Washtenaw and State of Michigan, have invented certain new and useful Improvements in Explosive-Engines, of which the following is a specification, reference being had therein to the accompanying drawings.

This invention relates to improvements in explosion engines, and more especially to engines of this type having double opposed cylinders.

The object of the invention is to provide an engine of this type which is very simple, cheap and durable in its construction, and in which the wear and consequent friction is greatly lessened from that of the ordinary construction and the cylinders are placed in alinement. To this end the two pistons are cast with a hollow cylindrical connecting member provided with openings through which the crank may be inserted therein, and upon the crank pin is journaled a revoluble disk adapted to engage at each side adjustable abutments on the pistons and roll in contact therewith as the crank is revolved.

The invention further consists in certain other new and useful features in the construction arrangement and combination of parts, all as hereinafter more fully described, reference being had to the accompanying drawings in which, Figure 1 is a longitudinal vertical section of an engine embodying the invention and showing one of the pistons in side elevation; Fig. 2 a horizontal section of the same; Fig. 3 is a perspective view of the pistons removed from their cylinders; Fig. 4 is a perspective view of the crank disk assembled; and Fig. 5 is a similar view of the parts of the crank disk detached and separated.

1, 1 represent the two opposed cylinders constructed in the usual manner with outwardly extending end flanges 2 to which the connecting crank case 3 is bolted, said crank case being divided vertically at its center into two parts secured together by bolts or cap screws extending through flanges on the two parts. The vertical side walls of the crank case are formed with bearings 4 for the crank shaft 5 one half of each bearing being formed on each part of the crank case so that the shaft may be conveniently set in its bearings, and a removable cover or top 6 is bolted upon the upper side of the case to tightly close the same.

The crank shaft is formed in the usual manner with integral crank arms 7 connected by a crank pin 8 and on this crank pin is revolubly mounted a disk 9 made in separable halves. At the axis of the disk each half thereof is cut away to form a rectangular opening 10 and on each half at its edge and projecting inwardly from the edge of the opening are lugs 11 which also project laterally at each side of the disk. Bearing blocks 12 having flanges to fit within the opening in the disk are secured to the lugs by bolts passing through said lugs and flanges, and these bolts thus also serve to secure the two halves of the disk firmly together.

13, 13 are the two pistons which are cast with an integral connecting hollow cylindrical portion or web 14 of lesser diameter than the pistons and in each side of said connecting web is formed a slot 15 through which the crank shaft extends, said slots being of a sufficient length to permit the full travel of the pistons. In the upper and lower sides of said web are slots or openings 16 through which the crank disk is projected as it is carried around by the crank and through which the halves of the disk are inserted in assembling, the bearing blocks being put in position in the halves of the disk, the halves inserted through said slots at each side of the crank pin and the halves and blocks then securely bolted together upon said pin.

Extending diametrically across within each piston is a vertical wall or web 17 to strengthen the piston and also form a place of attachment for an abutment block 18, which blocks are each provided in one end with a groove 19 to receive the edge of the disk, said disk by its engagement with said grooves preventing the pistons from turning. These abutments are each adjustably attached to the end of the wall 17 by providing each with flanges 20 to extend into the end of the piston at each side of the wall to which they are secured by bolts 21 passing through slightly elongated holes 22 in said flanges and holes in the wall so that by loosening said bolts the block may be moved outward slightly as the disk wears away and thus take up the lost motion to prevent pounding. To so move each block, the same is internally cut away or chambered adjacent to the end of the wall 17 and in this chamber 23 is placed a wedge 24 having a straight side engaging the end of the wall and a slanting side engaging the similarly inclined end wall of the chamber. The bottom of this chamber is open but the top is closed or nearly so by a wall 25 having a hole therein through which a bolt 26 passes loosely and engages a screw-threaded opening in the upper end of the wedge, so that by turning the bolt the wedge may be drawn upward in the chamber and by means of its inclined side engaging the inclined wall on the block, forces said block toward the disk. A very accurate adjustment is secured by this means and all play or lost motion between the blocks and disk taken up.

The length of the crank from the center of the crank shaft to the center of the crank pin is considerably less than one-half the diameter of the disk so that said crank and crank shaft will be within the circumference of the disk and the disk will prevent the abutment from striking the crank or shaft. The grooves or ways for the disk in the faces of the abutments are also more than twice the length of the crank arm between centers so that the disk will be in contact with some portion of said ways at its diametrically opposite sides at all times.

By connecting the two pistons by means of the integral cylindrical web, the manufacture is facilitated as both pistons may be accurately turned up at the same time and a very strong, rigid construction is secured. By employing the crank disk instead of the usual piston rod connections, the necessity for offsetting the cylinders is obviated and the construction simplified and cheapened.

As shown in Fig. 1, when the pistons are traveling in the direction of the arrows and the crank shaft is turning in the direction indicated, the disk will roll in the direction of the arrow, traveling upward in the groove of the left hand abutment, owing to the fact that the explosion taking place in the left cylinder is forcing the abutment at that side into heavy frictional contact with the disk, while the pressure in the right hand cylinder has just been relieved, relieving the heavy pressure on the disk at that side. This continual rolling contact of the disk within the grooves of the abutments, greatly reduces friction and consequent wear.

Having thus fully described my invention what I claim is:—

1. In an opposed cylinder engine, the combination with connected pistons, and a crank between said pistons, of a disk revolubly mounted upon the crank pin of the crank, and an abutment adjustably secured to each piston and each provided with a vertical groove to receive one edge of the disk.

2. In an opposed cylinder engine, the combination with connected pistons and a crank shaft having crank arms and a crank pin connecting said arms, of a disk made in halves and formed with an opening at its center, lugs on the disk, bearing blocks fitting in said opening, bolts extending through the lugs and blocks to secure the bearing upon the crank pin and the two halves of the disk together, and abutments carried by the pistons engaging the edge of the disk.

3. In an opposed cylinder engine, the combination of cylinders each provided with a flange at its base, a crank case secured to said flanges and formed with bearings in its sides and divided into two parts along the vertical center-line of said bearings, a crank shaft in said bearings, pistons in the cylinders, a hollow cylindrical web formed integral with and connecting the pistons and provided with longitudinal slots in its sides for the crank shaft, a crank on the crank shaft, a disk carried by the crank, and abutments on the pistons in engagement with the disk.

4. In an opposed cylinder engine, the combination with connected pistons and a crank between said pistons, of a vertical wall extending diametrically across each piston, abutments each having parallel flanges projecting into the end of the piston at each side of the wall and formed with elongated holes, bolts extending through said holes in the walls to secure the abutments to the walls, and a revoluble disk carried by the crank and engaging said abutments at diametrically opposite points of its periphery.

5. In an opposed cylinder engine, the combination with opposed pistons, of a hollow cylindrical web portion formed integral with and connecting said pistons, said web being provided with longitudinal slots in its sides and top and bottom, a crank shaft extending through the side slots, a revoluble disk mounted upon the crank shaft, a vertical wall extending diametrically across each piston, an abutment adjustably secured to the end of each wall and formed with a vertical groove in its contact face and a chamber adjacent to the end of the wall having an inclined end, a wedge in said chamber having an inclined side engaging the inclined end of the chamber, and a bolt extending through an opening in the top of the chamber and engaging a screw-threaded opening in the upper end of the wedge.

In testimony whereof I affix my signature in presence of two witnesses.

DANIEL A. SEYLER, Jr.

Witnesses:
OTTO F. BARTHEL,
OLIVER E. BARTHEL.